United States Patent
Enenkl et al.

(10) Patent No.: US 8,128,367 B2
(45) Date of Patent: Mar. 6, 2012

(54) ROTOR BLADE FOR A BEARINGLESS ROTOR OF A ROTORCRAFT

(75) Inventors: Bernhard Enenkl, Bockhorn (DE); Rupert Pfaller, Riemerling (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 1027 days.

(21) Appl. No.: 12/048,601

(22) Filed: Mar. 14, 2008

(65) Prior Publication Data

US 2008/0226459 A1    Sep. 18, 2008

(30) Foreign Application Priority Data

Mar. 16, 2007 (DE) .................... 10 2007 013 291 U

(51) Int. Cl.
*B64C 27/473* (2006.01)

(52) U.S. Cl. ..................................... 416/103; 416/223 R

(58) Field of Classification Search .................. 416/240, 416/23, 24, 103, 104, 105, 106, 107, 132 R, 416/132 A, 147, 223 R
See application file for complete search history.

(56) References Cited

U.S. PATENT DOCUMENTS

| | | | | |
|---|---|---|---|---|
| 2,674,327 A | * | 4/1954 | Pullin et al. ................... | 416/226 |
| 2,754,915 A | * | 7/1956 | Echeverria, Jr. ............... | 416/226 |
| 3,002,567 A | * | 10/1961 | Stulen et al. .................. | 416/226 |
| 3,261,407 A | * | 7/1966 | Culver et al. .................. | 416/112 |
| 4,081,220 A | * | 3/1978 | Andrews ....................... | 416/226 |
| 4,275,994 A | * | 6/1981 | Underhill, Jr. ................ | 416/226 |
| 4,976,587 A | * | 12/1990 | Johnston et al. ............... | 416/230 |

FOREIGN PATENT DOCUMENTS

| | | |
|---|---|---|
| DE | 2214262 | 10/1972 |
| DE | 2823389 | 12/1979 |
| DE | 19915085 | 12/1999 |

\* cited by examiner

*Primary Examiner* — Edward Look
*Assistant Examiner* — Christopher R Legendre
(74) *Attorney, Agent, or Firm* — Brooks Kushman P.C.

(57) ABSTRACT

A rotor blade for a bearingless rotor of a rotorcraft includes a flapwise-flexible and lead-lag-flexible rotor blade attachment region, an inner rotor blade segment, and an outer rotor blade segment. The inner rotor blade segment includes a blade root region and an aerodynamically effective rotor blade profile having a front profile region and a rear profile region relative to a blade depth direction. The front profile region includes a spar disposed in the blade root region and extending in the blade radius direction, the front profile region and spar embodied as a torsionally flexible hollow body in a region of the inner rotor blade segment, and the rear profile region being torsionally stiff. The front profile region and the rear profile are separated by a separation distance in the inner rotor blade segment. The torsional flexibility of the front profile region and the separation distance decreases with increasing blade radius in the inner rotor blade segment. In addition, in the outer rotor blade segment, the front and the rear profile segment are embodied as a closed, torsionally stiff profile.

9 Claims, 4 Drawing Sheets

Section A-A   Section B-B   Section C-C   Section D-D   Section E-E

Section A-A

Section C-C  Section D-D

Section E-E

ROTOR BLADE FOR A BEARINGLESS ROTOR OF A ROTORCRAFT

Priority is claimed to German Patent Application No. DE 10 2007 013 291.5, filed on Mar. 16, 2007, the entire disclosure of which is incorporated by reference herein.

The present invention relates to a bearingless rotor blade of a rotorcraft or to a variable-pitch propeller.

BACKGROUND

It is known that rotor blades for rotorcraft are manufactured predominantly from fiber composite material that, during operation of the rotorcraft, deflects in various directions and is thereby highly stressed. For that purpose, the rotor blade of a bearingless rotor encompasses at its inner end toward the rotor head a structural element configured in flexurally and torsionally flexible fashion, called a flex beam, that permits motions in the flapwise or lead-lag direction, as well as angular deflection about the torsion axis. The flex beam furthermore transfers the centrifugal forces of the blade to the rotor head. The torsionally flexible region of the flex beam is located inside a torsionally stiff control bag, by way of which control motions are introduced into the lift-generating blade region of the rotor blade. A rotor blade of this kind for a bearingless rotor is disclosed, for example, in DE 199 15 085 A1.

SUMMARY OF THE INVENTION

A disadvantage arising in this context is the fact that the control bag surrounding the flex beam results in a thickening of the rotor blade in this region, which causes increased aerodynamic drag. In addition, the flex beam is difficult to inspect because of the enveloping control bag. Disadvantages additionally result in terms of production, since the internally located flex beam and the control bag are difficult to produce simultaneously. Undesired penetration of water into the control bag, and from there into the supporting foam of the aerodynamically profiled blade region, must be prevented by additional actions.

It is an aspect of the present invention to make available a rotor blade for a bearingless rotor of a rotor craft, which blade possesses more-favorable aerodynamic properties, enables simple maintenance, and requires less production outlay.

According to the present invention, the rotor blade for a bearingless rotor of a rotorcraft encompasses an inner rotor blade segment as viewed in the blade radius direction, having a rotor blade attachment region embodied in flapwise-flexible and lead-lag-flexible fashion, a blade root region, a spar extending in the blade radius direction, and an aerodynamically effective rotor blade profile having, as viewed in the blade depth direction, a front profile region comprising the spar and embodied as a hollow body, and a rear profile region, such that in the region of the inner rotor blade segment, the spar and the front profile region are embodied in torsionally flexible fashion and the rear profile region in torsionally stiff fashion; and outside the blade root region as viewed in the blade radius direction, the front profile region that assumes the function of a flex beam is at first entirely separated from the rear profile region that assumes the function of a control bag, and with increasing blade radius direction the torsionally flexible embodiment of the spar and of the front profile region, and the separation between the front and the rear profile region, steadily decrease, and outside the inner rotor blade segment the front and the rear profile region are embodied as a closed, torsionally stiff profile.

As a result of the embodiment according to the present invention of the rotor blade, the aerodynamically profiled blade region now advantageously transitions directly into a blade region of torsionally flexible configuration that assumes the function of the flex beam, and into a blade region of torsionally stiff configuration that assumes the function of the control bag. In other words, the front profile region assuming the torsionally elastic properties of the previous flex beam, as well as the rear profile region assuming the function of the control bag, are each part of the aerodynamically effective rotor blade profile. It is no longer necessary to provide and configure a separate control bag. As a consequence thereof, the rotor blade according to the present invention exhibits improved aerodynamic properties. Further advantages result in terms of production, since the profile can now be manufactured in one operation from one mold, with decreased production outlay. Simplified maintenance is also ensured, since the front profile region assuming the torsionally elastic properties of the flex beam, and the rear profile region assuming the function of the control element, can more easily be accessed and inspected as parts of the aerodynamic rotor blade profile. It is now additionally possible, as a result of the configuration according to the present invention of the rotor blade and the resulting omission of the control bag, to make the torsionally flexible region longer (as viewed in the blade radius direction) without incurring aerodynamic disadvantages.

According to an embodiment of the invention, the inner rotor blade segment comprises a first subregion and a second subregion adjacent thereto as viewed in the blade radius direction. In the first subregion, the rear profile region is embodied as a closed profile having a front (as viewed in the profile depth direction) separating skin strip, and is completely separated from the front profile region by a slot arranged between the separating skin strip and the spar. At the beginning of the second subregion, the rear and the front profile region are joined to one another on their upper profile side by means of a covering skin strip. With increasing blade radius the separating skin strip assumes an arc-shaped conformation having a vertex and having a limb associated with the rear and the front profile region, the vertex height of the arc-shaped separating skin strip decreasing with increasing blade radius. The arc-shaped configuration of the separating skin strip with a limb associated with the rear and the front profile region means that in the second subregion, the separating skin strip transitions into the lower profile covering skin or forms part of the profile covering skin. In other words, the arc-shaped conformation is to be construed as an "indentation" in the lower covering skin, which indentation continuously decreases with increasing blade radius and is completely abolished outside the inner rotor blade segment.

In order to enable a variable twist of the profile in the transition region in which the front and the rear profile region are joined to one another by means of the covering skin strip, the covering skin strip is embodied in flexurally flexible fashion. The covering skin strip of flexurally flexible configuration replaces a discrete hinge, and is to be construed as a kind of "elastic" flap. The transition region having a covering skin strip of flexurally flexible configuration is one possibility. The concept also functions without this elastic covering skin strip. The rear profile region is then joined by way of a rib to the torsionally flexible front region having approximately a C-shaped profile.

The rear profile region preferably exhibits, at the beginning (as viewed in the blade radius direction) of the first subregion of the inner rotor blade segment, a cross-sectional area that is enlarged with respect to the rotor blade profile. The effect of this is that torsional stiffness is greatly elevated in this segment forming the attachment region. The enlarged cross-sectional area furthermore makes sufficient space available for articulation of a control rod.

The rear profile region is preferably embodied as a sandwich. In other words, the rear profile region does not differ in principle from the construction of the aerodynamically profiled blade. Because the rear profile region is not hollow, actions for preserving the cross section under load are superfluous. A cross-sectional deformation under load would decrease the torsional stiffness.

Advantageously, a covering is applied onto the slot and/or onto the gap formed in the lower covering skin by the arc-shaped separating skin strip. The application of a covering onto the slot and/or onto the gap configured in the lower covering skin has the effect that improved aerodynamics are thereby ensured.

The spar and the rotor blade attachment region that is embodied in flapwise-flexible and lead-lag-flexible fashion are preferably embodied integrally. The integral embodiment proves to be advantageous because simplified production is thereby enabled.

According to a particularly preferred embodiment of the invention, in the region of the inner rotor blade segment the spar is embodied in C-shaped fashion, having a nose region and an upper and lower flange; for greater torsional flexibility, this flange can be slotted.

The C-shaped spar preferably comprises at least one further flange shaped onto the nose region and arranged between the upper and lower flanges, the length of said further flange, as viewed in the blade depth direction. steadily decreasing with increasing blade radius. This ensures, in simple fashion, a spar configuration that is increasingly torsionally stiff as viewed in the blade radius direction.

According to another embodiment of the invention, in a blade root region the C-shaped spar is configured without the nose region. Configuring the C-shaped spar without the nose region has the effect of making the torsionally flexible cross section into a torsionally flexible warping-torsion-free cross section. The somewhat poorer aerodynamic properties are less troublesome in this region because of the lower flow velocity at the blade.

Advantageously, in this context the blade root region is faired with a short tube having a C-shaped cross section. The short tube having a C-shaped cross section serves on the one hand as an aerodynamic fairing of the innermost, warping-torsion-free segment of the spar, and as a reinforcement of the torsional stiffness in the attachment region, and advantageously allows lead-lag dampers and a rotary joint for the rear profile region to be accommodated.

Further advantages, features, and possible applications of the present invention are evident from the description below in combination with the exemplifying embodiments depicted in the drawings.

BRIEF DESCRIPTION OF THE DRAWINGS

The invention will be further described below with reference to the exemplifying embodiments depicted in the drawings, in which.

DETAILED DESCRIPTION

Figure 1:
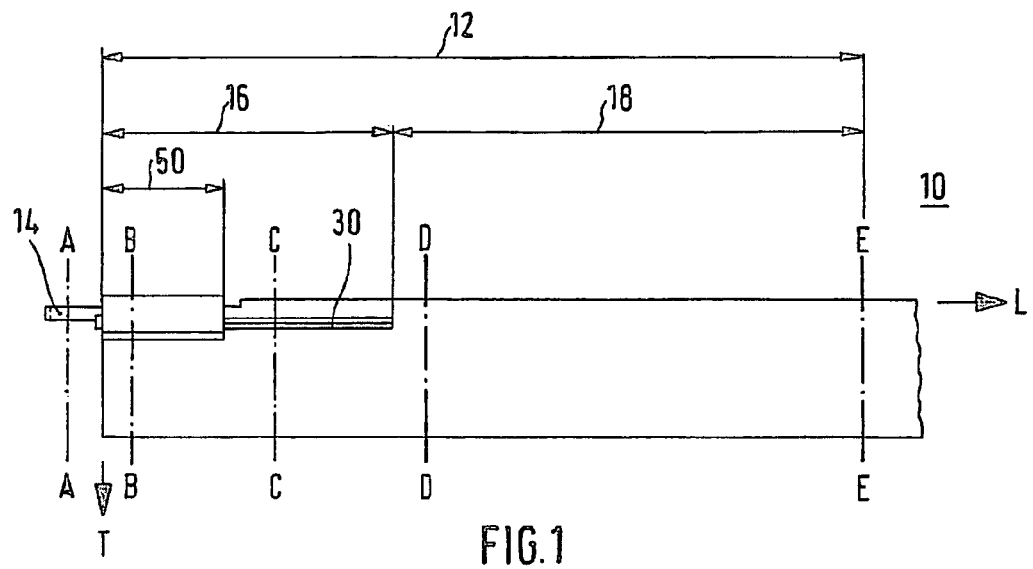
FIG. 1 is a plan view of a first exemplifying embodiment of a rotor blade according to the present invention for a bearingless rotor of a helicopter.

The terms used in the list of reference characters provided below, and associated reference characters, are used in the description, the claims, the abstract, and the drawings.

In order to avoid repetition, identical constituents and components are also identified with identical reference characters in the description that follows and in the Figures, provided no further differentiation is necessary or advisable.

FIG. 1 is a more or less schematic plan view of a rotor blade, labeled in its entirety with the reference number 10, for a bearingless rotor of a helicopter.

What is depicted of rotor blade 10 is substantially an inner (as viewed in blade radius direction L) rotor blade segment 12 having a rotor blade attachment region 14 embodied in flapwise-flexible and lead-lag-flexible fashion. Inner rotor blade segment 12 in turn comprises a first subregion 16 and a second subregion 18 adjacent thereto as viewed in blade radius direction L.

In known fashion, rotor blade 10 comprises a spar 20 extending in blade radius direction L, and an aerodynamically effective profile 22. Spar 20 and rotor blade attachment region 14 are embodied integrally, i.e. as viewed in blade radius direction L, rotor blade attachment region 14 transitions into spar 20.

Figure 2:
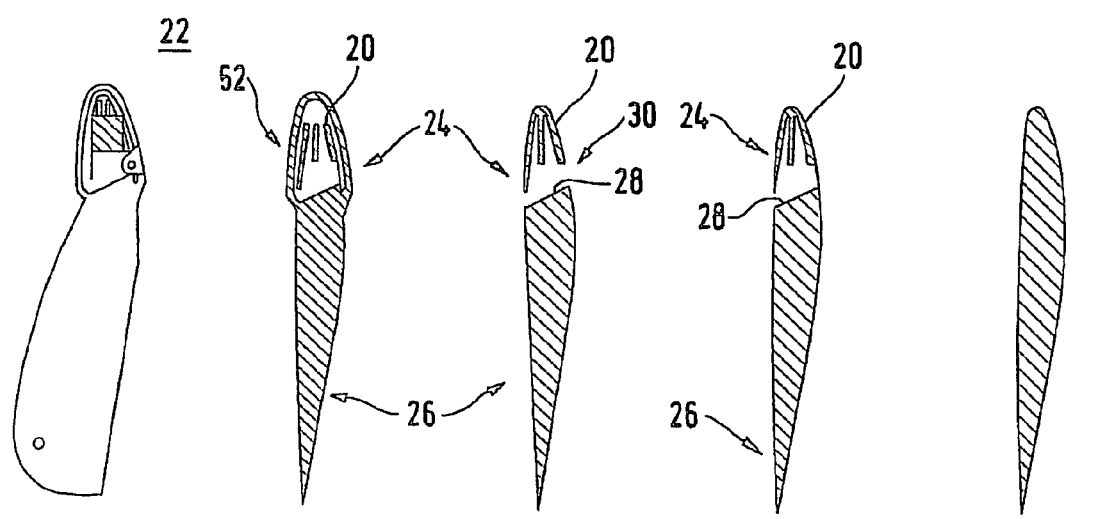
FIG. 2 shows various profile sections of the inner rotor blade segment of the rotor blade of FIG. 1.
Figure 3:
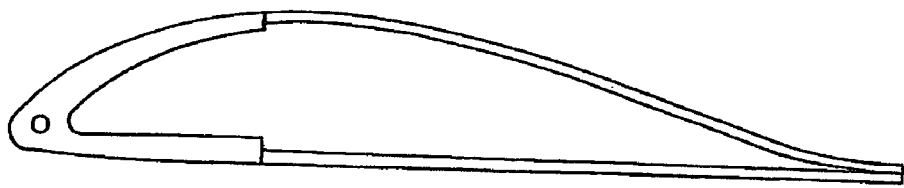
FIG. 3 shows further profile sections of the second subregion of the inner rotor blade segment of the rotor blade of FIG. 1.
Figure 3:
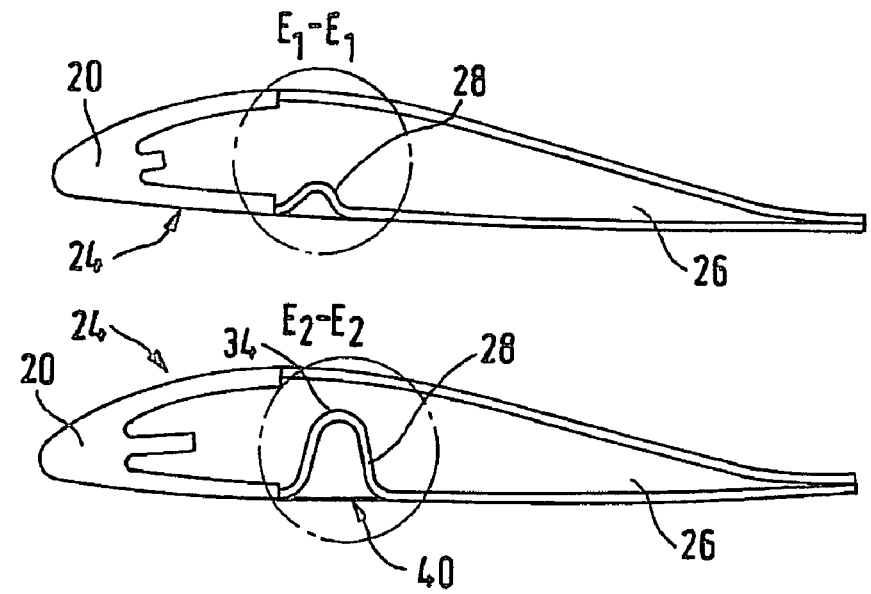
Figure 3:
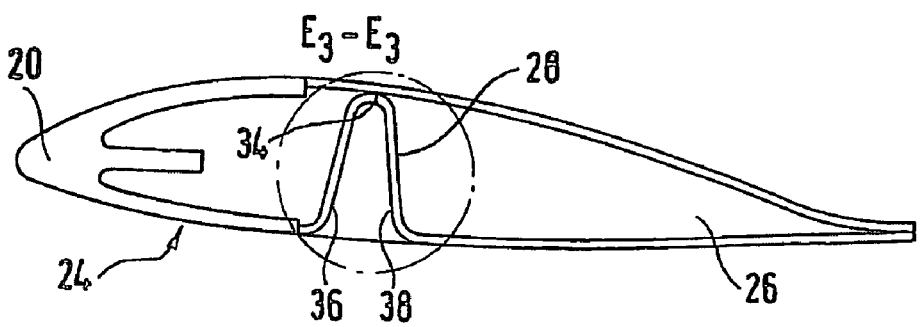
Figure 3:
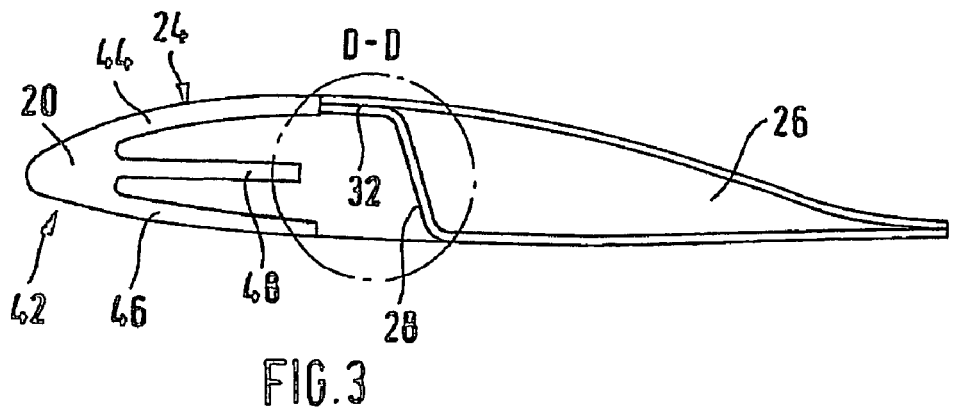

In the region of inner rotor blade segment 12, aerodynamically effective profile 22 has a front (as viewed in blade depth direction T) profile region 24 constituting spar 20 and embodied as a hollow body, and a rear profile region 26 embodied as a foam sandwich (cf. FIGS. 2 and 3). In the region of inner rotor blade segment 12, spar 20 and front profile region 24 forming spar 20 are embodied in torsionally flexible fashion, while rear profile region 26 is embodied in torsionally stiff fashion. The torsionally flexible configuration of spar 20 and of front profile region 24 forming spar 20 decreases with increasing blade radius L. Spar 20, front profile region 24 forming spar 20, and rear profile region 26 are each embodied in torsionally stiff fashion outside inner rotor blade segment 12, and form an aerodynamically profiled blade region (cf. profile section E-E).

As is evident in particular from FIG. 2 (cf. profile section C-C), the torsionally stiff rear profile region 26 is embodied in first subregion 16 of inner rotor blade segment 12 as a closed profile having a front (as viewed in profile depth direction T) separating skin strip 28. Rear profile region 26 is completely separated from front profile region 24 of torsionally flexible configuration by a slot 30. In other words, two separate profiles—namely front profile region 24 and rear profile region 26—extend inward in first subregion 16 proceeding from the outer (as viewed in blade radius direction L) beginning of first subregion 16.

In second subregion 18 of inner rotor blade segment 12 (cf. section D-D), front and rear profile regions 24, 26 are initially joined to one another only by means of an elastic covering skin strip 32 in their upper profile side. In addition, as is evident in particular from FIG. 3, in second subregion 18 front separating skin strip 28 assumes, with increasing blade radius L, an arc-shaped conformation having a vertex 34 and having one limb 36 associated with front profile region 24 and one 38 with rear profile region 26 (cf. profile section $E_3$-$E_3$).

As may further be inferred from profile section $E_3$-$E_3$, the now arc-shaped separating skin strip 28 forms part of the lower profile covering skin, i.e. the arc-shaped conformation is to be construed as an "indentation" of the lower covering skin.

As is evident from the further profile sections $E_2$-$E_2$ and $E_1$-$E_1$, the limb height or the indentation depth continuously decreases with increasing blade depth direction L, so that outside the inner profile segment (profile section E-E), a homogeneous profile is present.

In order to reduce the aerodynamic disadvantages resulting from the indentation in the lower covering skin, a covering 40 is applied onto the indentation or onto the corresponding region of the arc-shaped separating skin strip 28.

In inner rotor blade segment 12, the torsionally flexible spar 20 is configured in substantially C-shaped fashion, comprising a nose region 42, an upper and a lower flange 44, 46, and a further flange 48 arranged between the upper and lower flanges 44, 46. The length (as viewed in blade depth direction T) of further flange 48 steadily decreases with increasing blade radius L. Outside inner rotor blade segment 12, the length of further flange 48 is entirely abolished, i.e. what is present is a spar having a C-shaped cross section, the wall thickness of the spar now remaining constant as viewed in blade radius direction L (cf. section E-E). In at least one embodiment the wall thickness of the nose regions and the upper and lower flanges increases with increasing blade radius.

In order also to make spar 20, which has a C-shaped cross section and was not previously free of warping torsion, free of warping torsion in the region of rotor blade attachment region 14, the C-shaped spar 20 is embodied without nose region 42 in a blade root region 50. For aerodynamic reasons, this blade root region 50 is faired by means of a short tube 52 having a C-shaped cross section. The tube cross section is usefully selected so that sufficient space is available for placement of a rotary joint and for the reception of lead-lag dampers.

In addition, as may be inferred from profile section A-A, rear profile region 26 comprises, at the beginning of blade root region 50 or at the beginning of first subregion 16 (as viewed in blade radius direction L), an enlarged cross-sectional area with respect to the rotor blade profile. Torsional stiffness is thereby greatly elevated in this segment that forms the attachment region, and sufficient space is made available for articulation of a control rod.

As a result of the above-described embodiment according to the present invention of rotor blade 10, front profile region 24 of torsionally flexible configuration encompassing spar 20 assumes the torsionally elastic properties of a flex beam, while the rear profile region 26 of torsionally stiff configuration assumes the function of a separate control bag. Because it is now no longer necessary to configure a separate control bag that thickens the profile cross section, the rotor blade according to the present invention exhibits improved aerodynamic properties.

Figure 4:
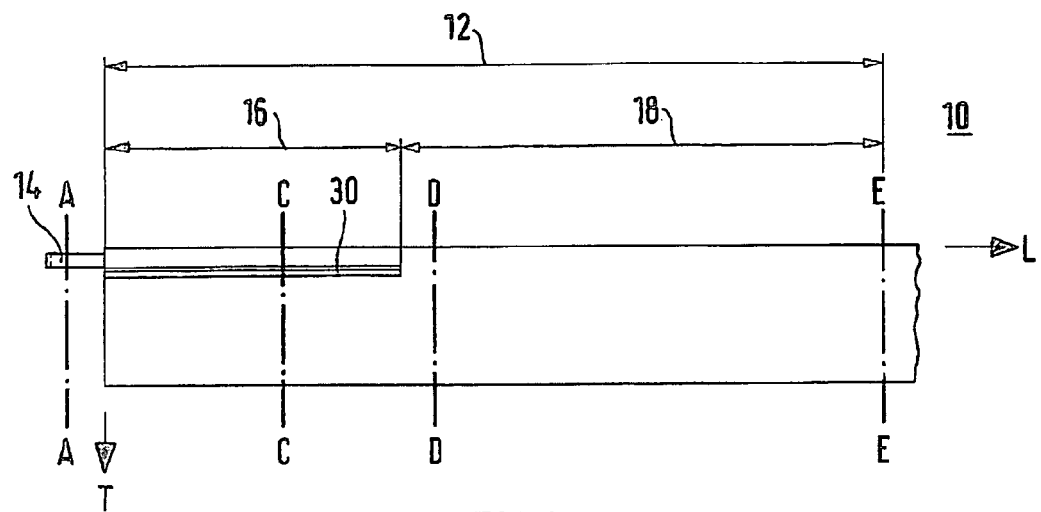
FIG. 4 is a plan view of a further embodiment of a rotor blade according to the present invention.
Figure 5:
FIG. 5 shows various profile sections of the inner rotor blade segment of the rotor blade of FIG. 4.
Figure 5:
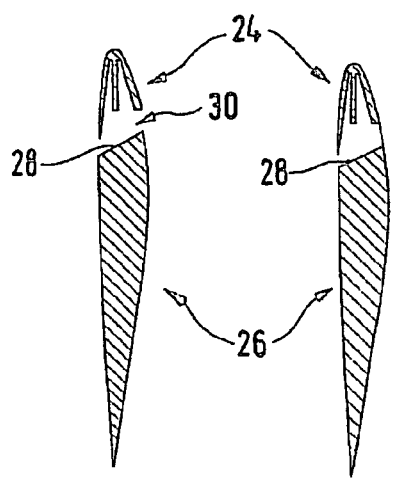
Figure 5:
Figure 6:
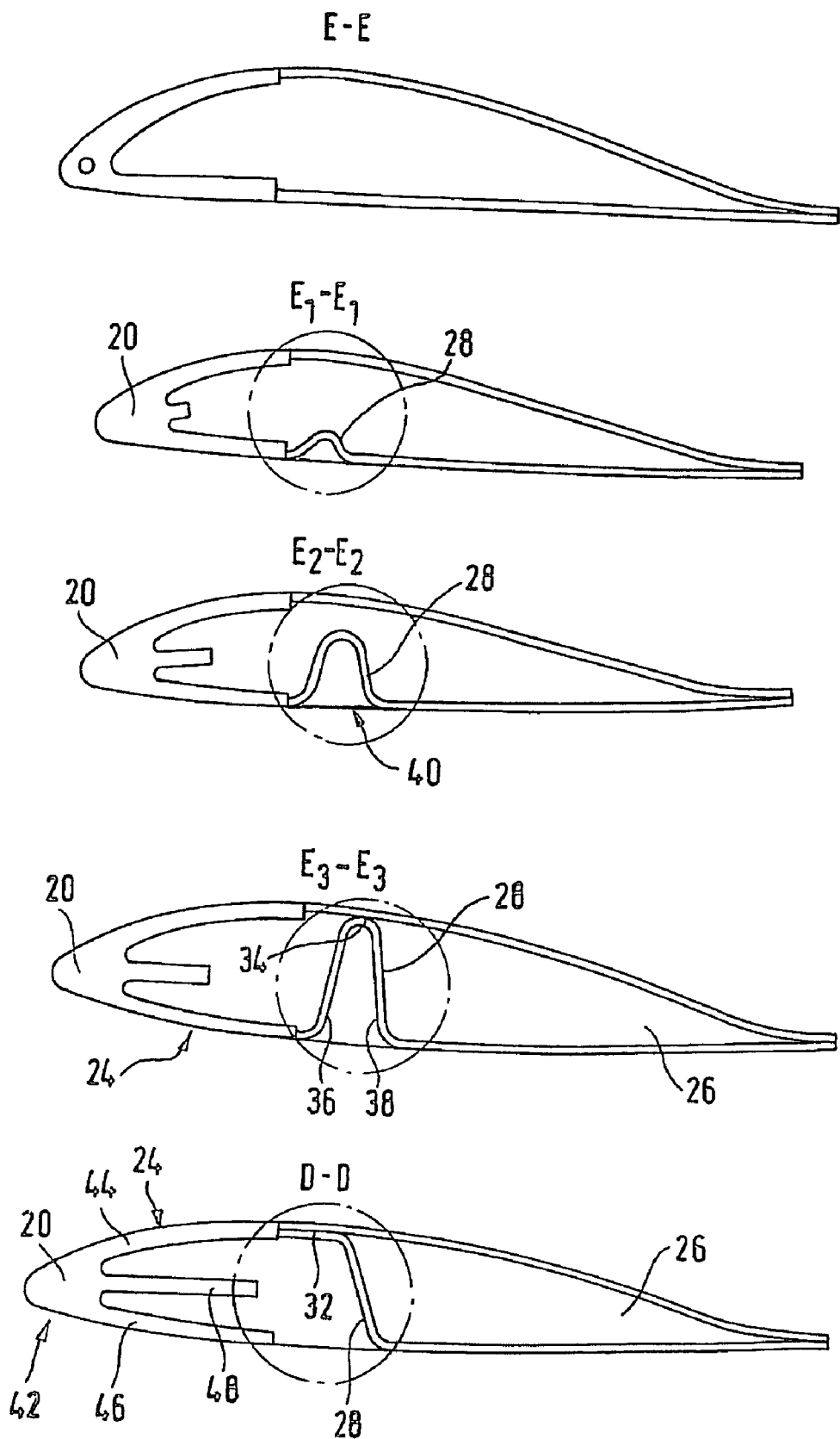
FIG. 6 shows further profile sections of the second subregion of the inner rotor blade segment of the rotor blade of FIG. 4.

A second embodiment of a rotor blade 10, with the appurtenant profile sections, is depicted in FIGS. 4 to 6. Rotor blade 10 depicted in FIG. 4 corresponds substantially to the embodiment already described. To avoid repetition, the reader is therefore referred to the statements already made above.

The only difference is that short tube 52 exhibiting a C-shaped cross section is omitted.

What is claimed is:

1. A rotor blade for a bearingless rotor of a rotorcraft defining a blade radius direction and a blade depth direction, the rotor blade comprising:
a flapwise-flexible and lead-lag-flexible rotor blade attachment region for articulation of a control rod;
an inner rotor blade segment; and
an outer rotor blade segment disposed outside the inner rotor blade segment relative to the blade radius direction, the inner rotor blade segment including a blade root region and an aerodynamically effective rotor blade profile having a front profile region and a rear profile region relative to the blade depth direction, the front profile region including a spar disposed in the blade root region and extending in the blade radius direction, the front profile region and spar embodied as a torsionally flexible hollow body in a region of the inner rotor blade segment, and the rear profile region being torsionally stiff,
wherein at least a portion of the front profile region and the rear profile region are separated by a separation distance in the inner rotor blade segment,
wherein the torsional flexibility of the front profile region and the separation distance decrease with increasing blade radius in the inner rotor blade segment,
wherein, in the outer rotor blade segment, the front and the rear profile region are embodied as a closed, torsionally stiff profile, and
wherein the inner rotor blade segment includes an inner subregion and an adjacent outer subregion relative to the blade radius direction, wherein, in the inner subregion, the rear profile region forms a closed profile having a front separating skin strip, and is completely separated from the front profile region by a slot disposed between the separating skin strip and the spar, and wherein at an inner portion of the outer subregion, the rear profile region and the front profile region are joined to one another on their upper profile side by means of a covering skin strip, and, with increasing blade radius the separating skin strip assumes an arc-shaped conformation having a vertex and limbs associated with the rear and the front profile regions respectively, a height of the vertex decreasing with increasing blade radius.

2. The rotor blade as recited in claim 1, wherein the covering skin strip is flexurally flexible.

3. The rotor blade as recited in claim 1, wherein a cross-sectional area of the rear profile region is enlarged at an inner end of the inner subregion.

4. The rotor blade as recited in claim 1, wherein the rear profile region is embodied as a sandwich.

5. The rotor blade as recited in claim 1, further comprising a covering disposed on at least one of the slot and the separating skin strip.

6. The rotor blade as recited in claim 1, wherein the spar and the rotor blade attachment region are embodied integrally.

7. The rotor blade as recited in claim 1, the spar is C-shaped in the inner rotor blade segment and, in at least a portion of the inner rotor blade segment, the C-shaped spar includes a nose region, an upper flange and a lower flange, and wherein a wall thickness of the nose regions and the upper and lower flanges increases with increasing blade radius.

8. The rotor blade as recited in claim 7, wherein the C-shaped spar includes at least one further flange shaped onto the nose region and disposed between the upper and the lower flanges, a length of the further flange decreasing with increasing blade radius.

9. The rotor blade as recited in claim 7, wherein the C-shaped spar does not include a nose region in the blade root region.

* * * * *